United States Patent [19]

Miller et al.

[11] 4,008,157
[45] Feb. 15, 1977

[54] END SEAL CONSTRUCTION FOR SEMIPERMEABLE MEMBRANE

[75] Inventors: Jimmy L. Miller, Waukegan; William J. Schnell, Arlington Heights, both of Ill.

[73] Assignee: Baxter Laboratories, Inc., Deerfield, Ill.

[22] Filed: Oct. 8, 1975

[21] Appl. No.: 620,546

[52] U.S. Cl. .................. 210/321 B; 210/494 M
[51] Int. Cl.² .................................. B01D 13/00
[58] Field of Search ...... 210/321 K, 321 R, 494 M; 55/158

[56] References Cited
UNITED STATES PATENTS

| 3,397,790 | 9/1968 | Newby et al. | 55/158 X |
| 3,880,760 | 4/1975 | Flandoli | 210/321 K |

*Primary Examiner*—Frank A. Spear, Jr.
*Assistant Examiner*—E. Rollins Cross
*Attorney, Agent, or Firm*—Paul C. Flattery; Gerald S. Geren; William K. Wells, Jr.

[57] ABSTRACT

A coil dialyzer for use in an artificial kidney system which employs an elongated, open-ended tubularly-shaped, semipermeable membrane is disclosed herein. The ends of the membrane are sealed by forming a flap at each end thereof which defines a fold line extending between the longitudinal edges of the membrane. A wedge-and-groove construction is provided for grasping each folded end of the membrane so as to maintain the fold line and thereby assure the seal.

5 Claims, 18 Drawing Figures

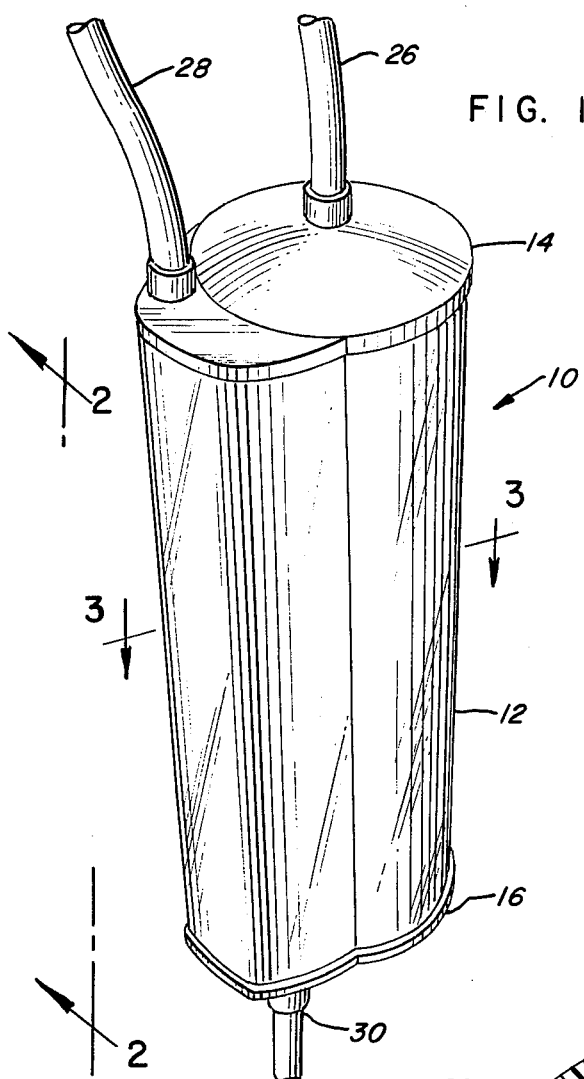
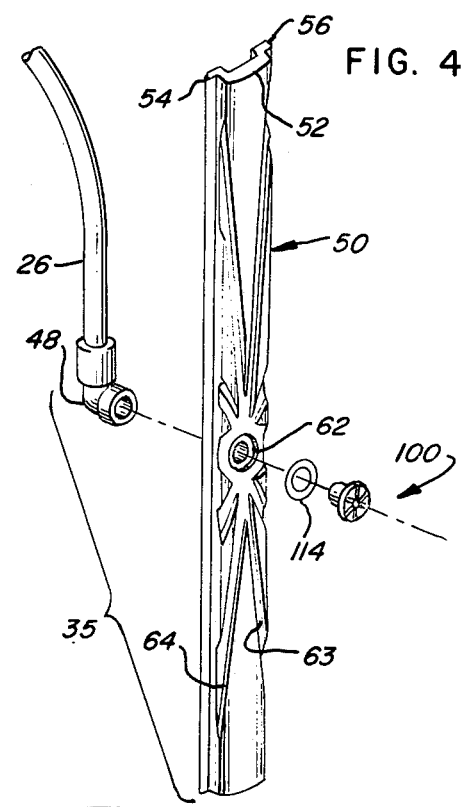
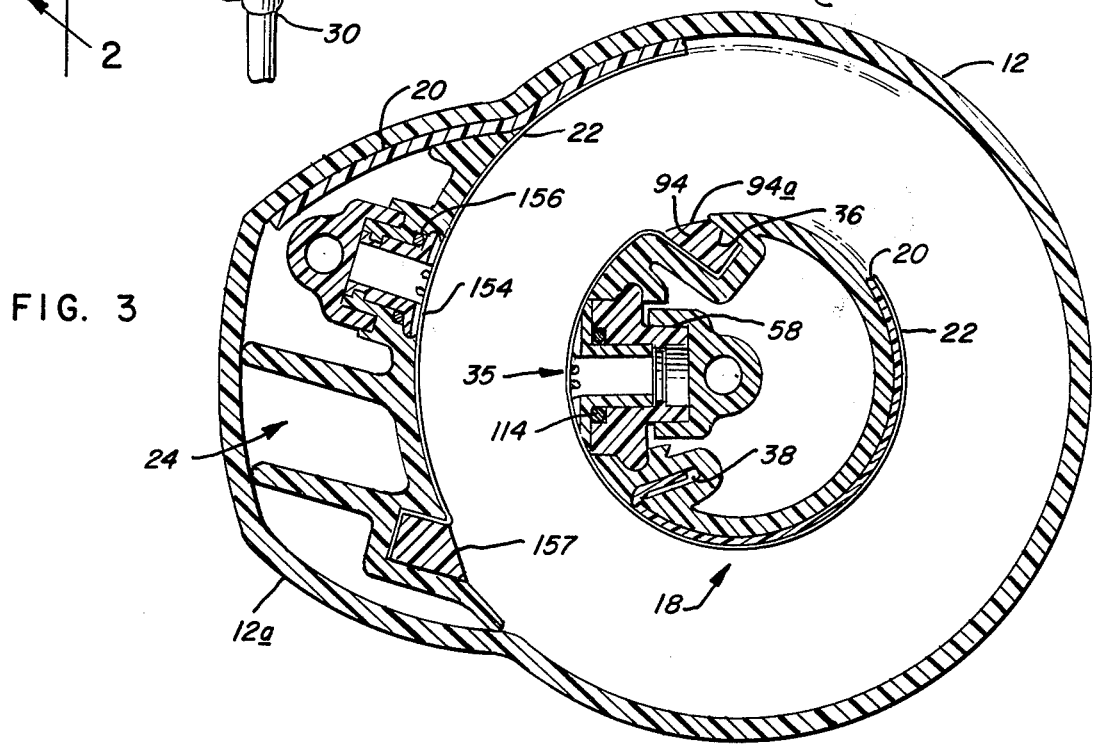

FIG. 11
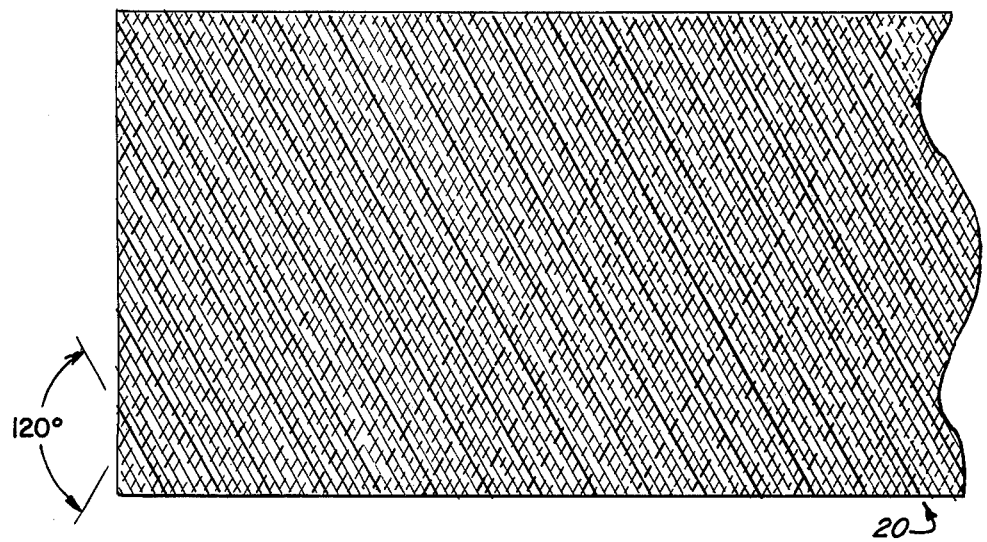
120°
20
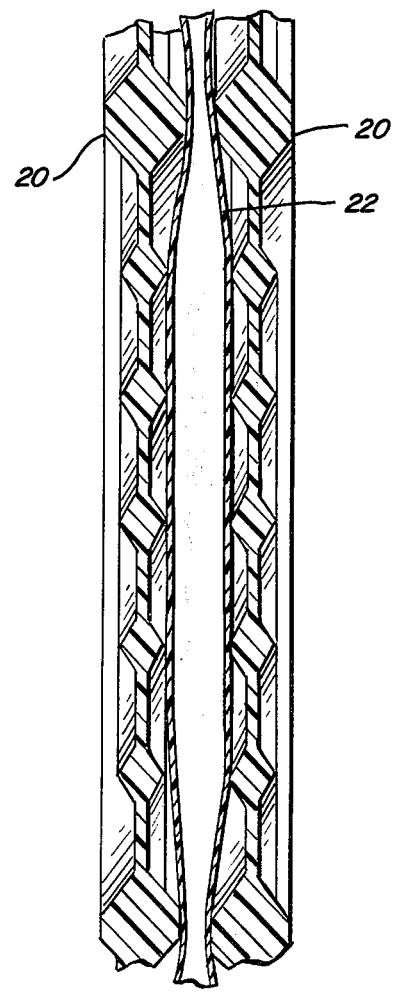
FIG. 12

FIG. 13
FIG. 14
FIG. 15
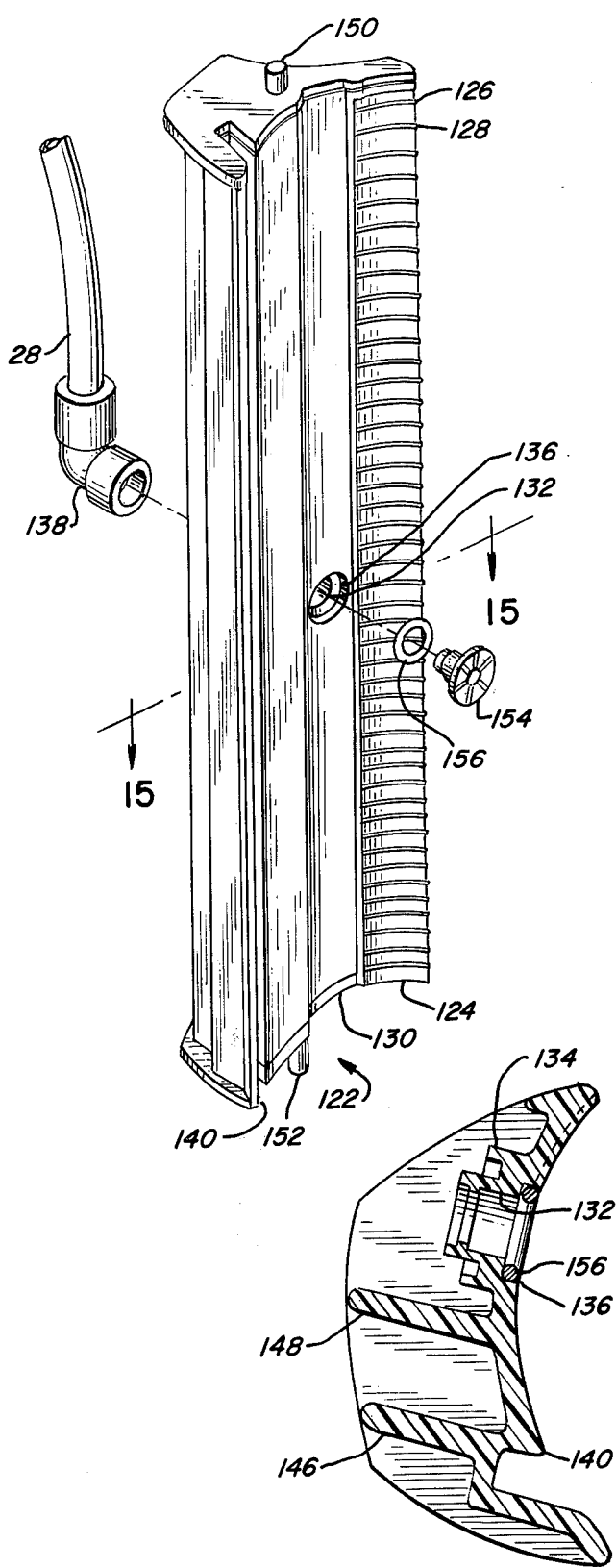
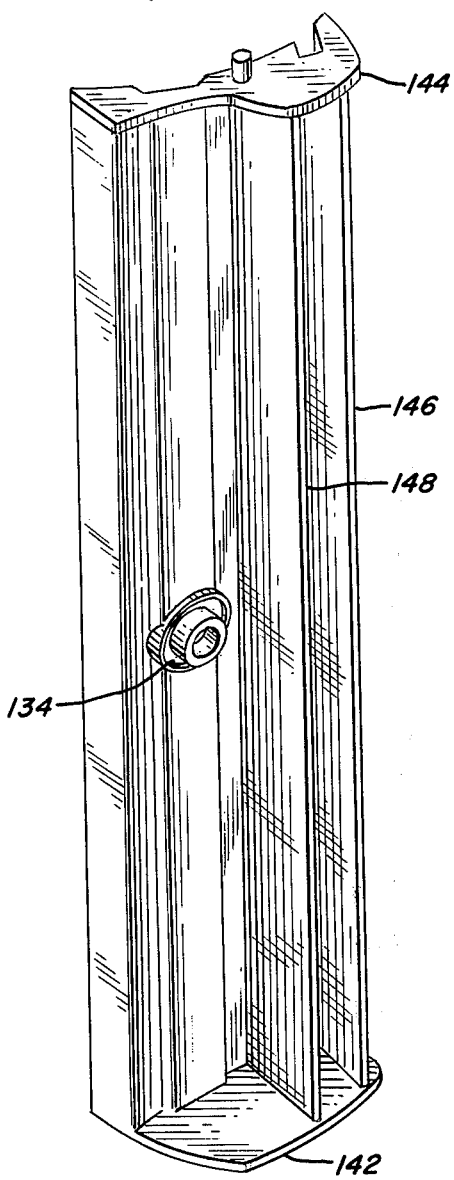
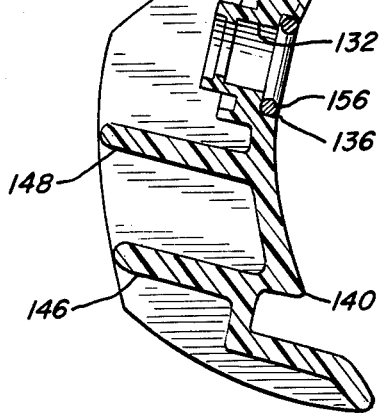

END SEAL CONSTRUCTION FOR SEMIPERMEABLE MEMBRANE

BACKGROUND OF THE INVENTION

This invention relates to mass transfer devices of the type which include a semipermeable membrane; and more particularly, to dialyzers of the type used in artificial kidney systems.

Artificial kidney systems are used to treat a patient's blood so as to remove waste products therefrom. One type of dialyzer used in such systems is commonly referred to as a coil dialyzer. It includes a flattened, tubularly-shaped, semipermeable membrane of a material, such as cellophane or polycarbonate, which along with an appropriate support member, is wound or coiled about a center core and enclosed in a cylindrical housing. Blood from a patient enters the dialyzer through an inlet in the core, flows through the dialyzer inside the membrane and exits the dialyzer through an outlet. Dialysis solution flows in a crosswise direction through the housing and between the wound support and membrane.

The dialysis solution contacts the membrane, and due to the difference in waste product concentration between the blood and the dialysis solution, the waste products, such as urea and creatinine, diffuse from the blood through the membrane and into the dialysis solution.

During treatment of blood in a dialyzer, water is removed from the blood by virtue of a process known as ultrafiltration. The amount of water which is removed is related to the difference in blood pressure and dialysis solution pressure on opposite sides of the membrane. Existing dialyzers operate at relatively high blood pressure levels which is related to the size and shape of the membrane and the membrane support. This high pressure may result in undesirably high and/or variable levels of water removal.

It is an object of this invention to provide a dialyzer wherein water removal is controllably maintained at a low level.

In existing dialyzers the conduits which carry blood to and from the dialyzer may become kinked where they enter and exit the dialyzer. Further, in existing constructions dialysis solution exits from the top of the dialyzer. This results in an esthetically displeasing "sloshing" sound.

It is another object of this invention to provide a dialyzer structure wherein kinking of the blood conduits is minimized and sloshing eliminated.

The cellophane membrane is relatively fragile and may rupture or tear during assembly of the dialyzer when the membrane is sealed and is connected to the blood conduits. It is yet another object of this invention to provide an improved end seal and connector which minimizes membrane damage.

Furthermore, existing dialyzers are relatively expensive to manufacture, and it is therefore another object of this invention to provide a dialyzer which is less expensive to manufacture.

These and other objects of this invention will become apparent from the following description and appended claims.

SUMMARY OF THE INVENTION

There is provided by this invention a dialyzer for use in an artificial kidney system, which operates at low controllable ultrafiltration levels, reduces conduit kinking at the dialyzer inlets and outlets, eliminates sloshing, and includes an improved end seal and connector construction.

The dialyzer includes a membrane and a membrane support member, which are constructed to provide a low blood pressure level and thereby assures low controllable levels of ultrafiltration. The dialyzer blood inlet and outlet conduits are generally axially aligned with respect to the housing so as to minimize kinking and the dialysis solution outlet is positioned so as to eliminate sloshing.

The dialyzer includes a folded end seal for closing the ends of the membrane and a blood button arrangement for connecting the membrane to the blood inlet and outlet. These features contribute to minimizing membrane damage.

Furthermore, many of the dialyzer components can be fabricated by fast and economical mass production techniques, such as extruding, embossing or injection molding, which reduce the cost of the dialyzer.

BRIEF DESCRIPTION OF THE DRAWINGS

FIG. 1 is a perspective view of a dialyzer made in accordance with the invention;

FIG. 3 is a transverse cross-sectional view taken substantially along line 3—3 of FIG. 1;

FIG. 4 is an exploded perspective view of an inlet jack assembly for use in the dialyzer;

FIG. 11 is a plan view of a support member of the type shown in FIGS. 9 and 10;

FIG. 12 is a sectional view taken substantially along line 12—12 of FIG. 8;

FIG. 13 is an exploded perspective view of an outlet jack assembly for use in the dialyzer showing the inner side of the outlet jack;

FIG. 14 is a perspective view of the outer side of the outlet jack;

FIG. 15 is a transverse cross-sectional view taken substantially along line 15—15 of FIG. 13.

DESCRIPTION OF THE PREFERRED EMBODIMENT

General

Figure 2:
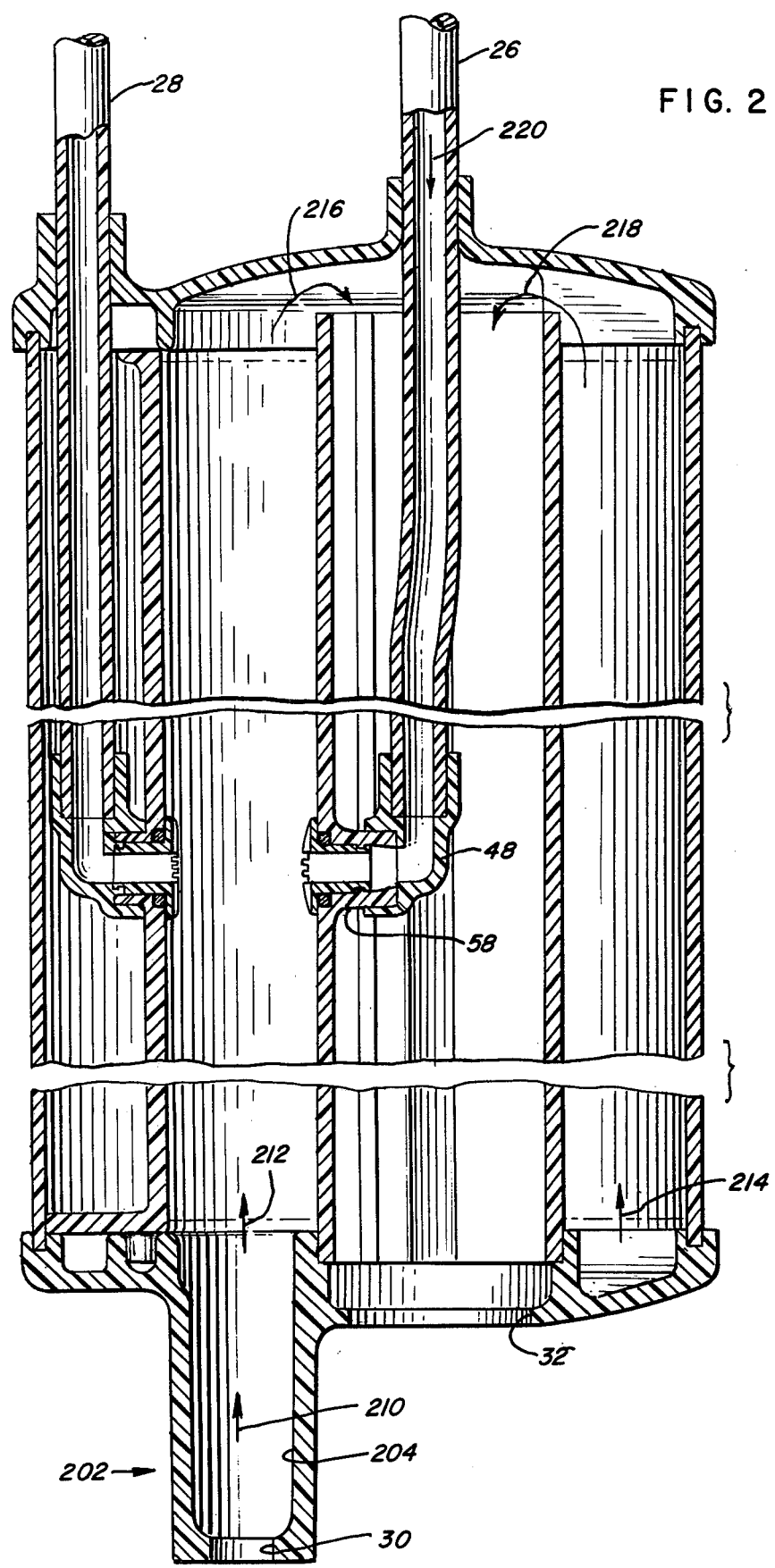
FIG. 2 is a fragmentary longitudinal cross-sectional view taken substantially along line 2—2 of FIG. 1.

Referring now to the drawings, and more particularly FIGS. 1–3, there is shown a dialyzer 10 having an outer casing which includes a hollow, elongated, pear-shaped, transparent, plastic housing 12, an upper or top end cap 14 and a lower or bottom end cap 16. The dialyzer also includes: a centrally-positioned, cylindrical, core assembly 18; an elongated plastic support member 20 and an elongated membrane 22, which are wound about the core assembly; and an outlet jack assembly 24. An inner centrally-positioned, flexible, plastic blood inlet tube 26 extends through the upper cap 14 and cooperates in directing blood entering the dialyzer into the membrane 22. An outer blood outlet tube 28 extends through the upper cap and directs blood exiting the membrane to a point outside the dialyzer. The lower end cap 16 also includes a dialysis solution inlet 30 and a dialysis solution outlet 32.

Generally speaking, blood from a patient who is being treated enters the dialyzer through the blood inlet tube 26, flows through the coiled tubular membrane 22, and exits the dialyzer through blood outlet tube 28. The dialysis solution enters the dialyzer through the inlet port 30, flows upwardly between the windings of the membrane and the membrane support, contacts the membrane so as to receive metabolic waste products and water from the blood, and exits the dialyzer through the outlet 32.

The Core Assembly

Figure 17:
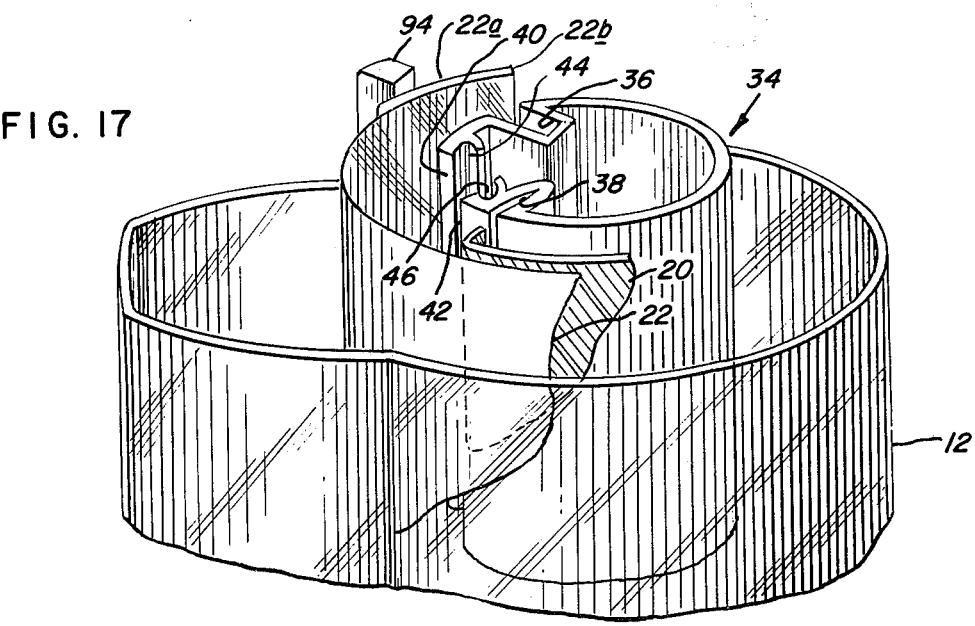
FIG. 17 is a fragmentary and exploded perspective view showing a portion of the dialyzer housing and core assembly.
Figure 18:
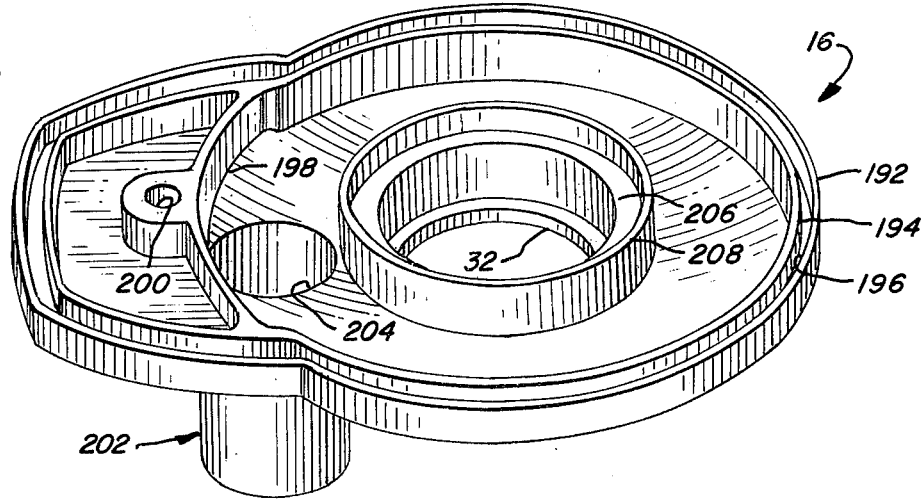
FIG. 18 is a perspective view of a bottom cap for use in the dialyzer.

The inner core assembly 18, as shown in FIGS. 2, 3 and 17, includes an elongated, C-shaped core 34, which is extruded from a plastic, such as styrene, and a separate inlet jack assembly 35. The core 34 is shaped to provide an offset somewhat U-shaped membrane retaining slot 36 and a smaller offset support member retaining slot 38. Both of these slots extend inwardly toward the center of the core and open outwardly toward the outside of the core. The facing edges 40 and 42 of the core each includes a semicircular jack-receiving slot 44 or 46 and define an elongated inlet-jack-receiving gap.

Figure 7:
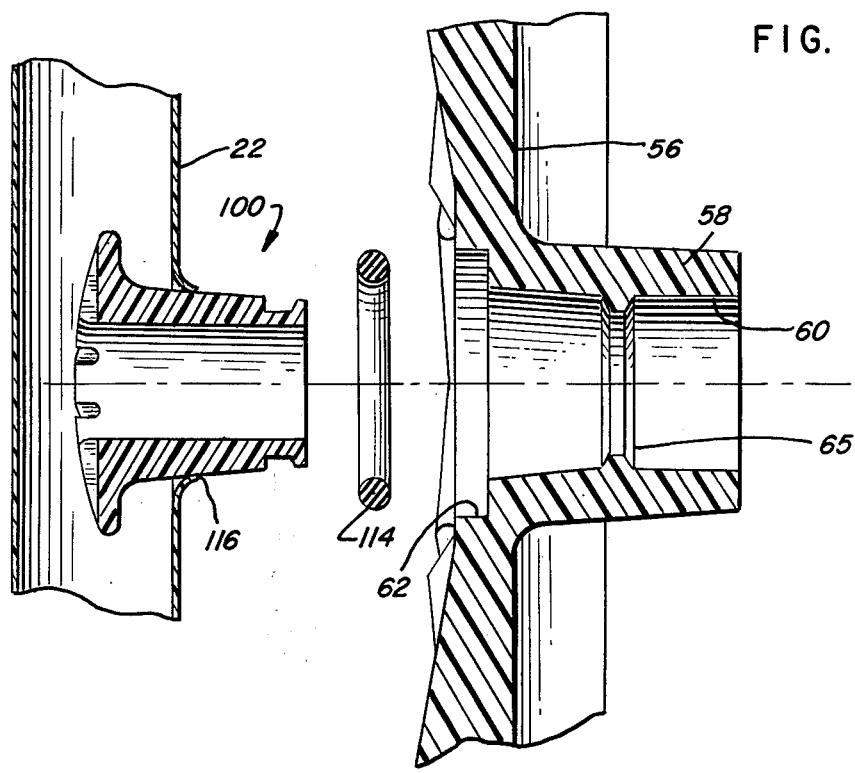
FIG. 7 is an exploded, fragmentary sectional view showing the connection between the inlet jack assembly and semipermeable membrane.
Figure 5:
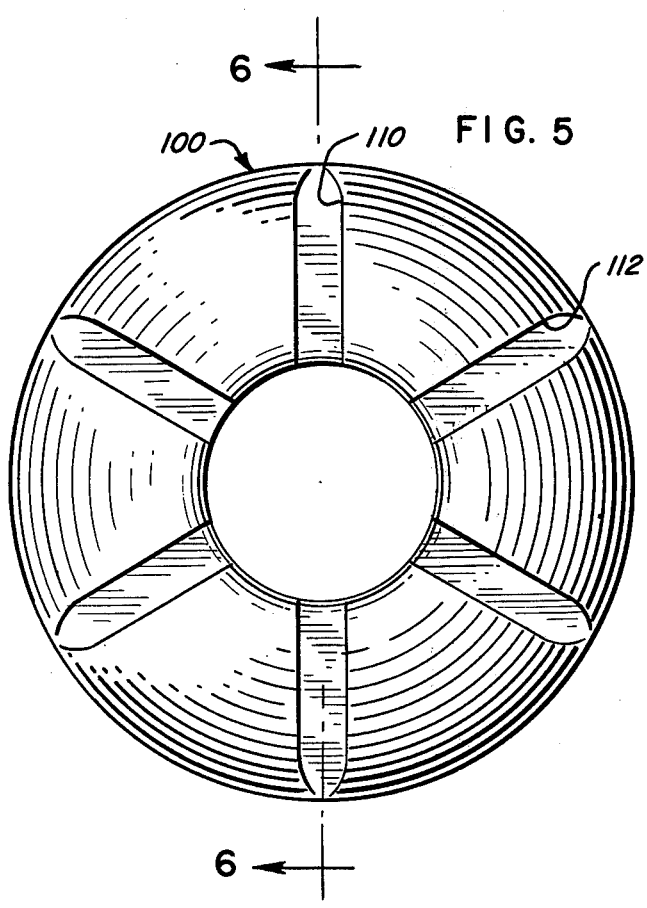
FIG. 5 is a top plan view of a blood button connector for use with the inlet jack assembly.
Figure 6:
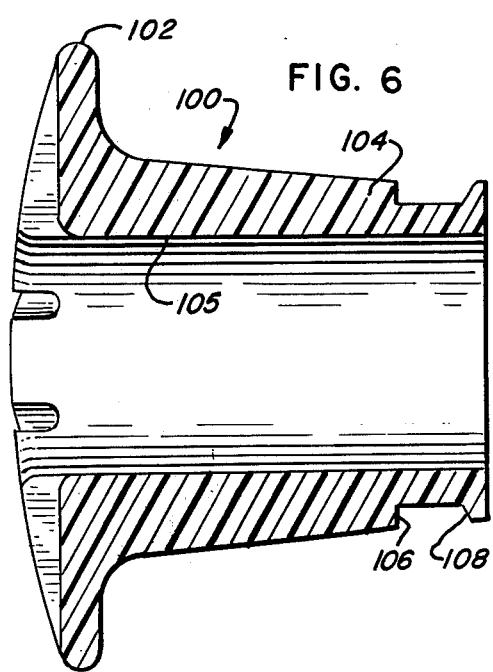
FIG. 6 is a longitudinal cross-sectional view taken substantially along line 6—6 of FIG. 5.

The inlet jack assembly 35, as shown in FIGS. 3, 4 and 7, includes the blood inlet tube 26, an inlet elbow 48, and an elongated molded inlet jack member 50. The jack member is constructed to fit within the gap defined by the core edges 40 and 42 and be bonded to the core 34. The jack member has a curved central body portion 52 and a pair of side flanges 54 and 56, which slidably and sealingly engage the jack-receiving slots 44 and 46. The outer surface of the central body portion of the jack is curved in a manner complementary to the curvature of the core so as to form a generally cylindrical core assembly.

A short, integral, boss-like structure 58 is centrally positioned between the ends of the jack member on the back side thereof and extends toward the center of the core assembly. A tapered passageway 60 extends transversely through the body portion 56 and through the boss 58. An integrally-molded, countersunk, O-ring-receiving, recess 62 is formed in the body portion 56 and surrounds the outer terminal end of the passageway 60 and a plurality of molded blood distribution grooves, such as 63 and 64, extend radially from the O-ring recess. A tapered internal, annular snap-lock shoulder 65 extends inwardly into the passageway adjacent the other end of the passageway.

The elbow 48 is bonded to outlet end of the blood inlet tube 26 and also telescopically engages and is bonded to the boss 58 so as to direct incoming blood flow from the tube 26 into the passageway 60.

The Membrane and The Support Member

Referring now to FIGS. 3, 8–12 and 17, the membrane 22 is an elongated, flattened tube of a semipermeable material, such as cellophane or a cellulose derivative sold under the trade name Cuprophan. The membrane is coiled or wound about the core assembly and serves as a conduit for the passage of blood through the dialyzer from the core assembly 18 to the outlet jack assembly 24. This membrane separates the blood and dialysis solution but permits blood waste products and water to pass from the blood into the dialysis solution contacting the membrane. It also permits preselected substances placed in the dialysis solution to pass through it and into the blood.

The support member is longer and wider than the membrane and may be of the conventional open mesh screen type as disclosed in U.S Pat. Re. No. 27,510 or of an embossed type, such as is disclosed in U.S. Pat. No. 3,687,293. Such an embossed support includes an imperforate center web having equal-height, membrane-engaging ribs on each side of the web.

Figure 9:
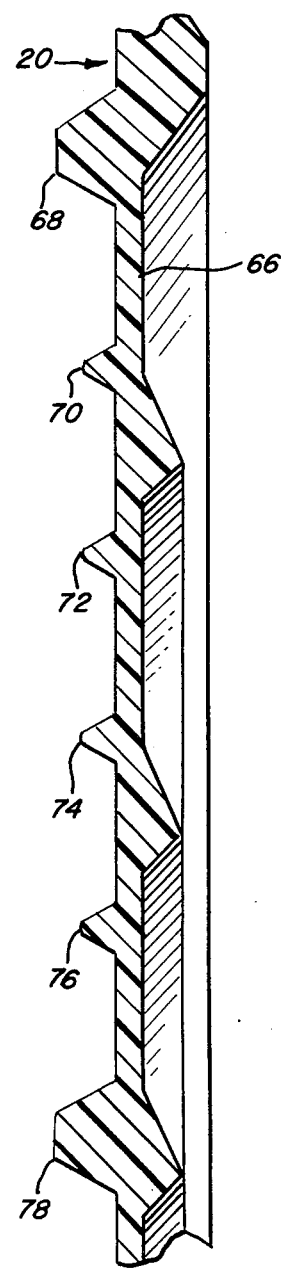
FIG. 9 is a sectional view of the support member taken substantially along line 9—9 of FIG. 8.
Figure 10:
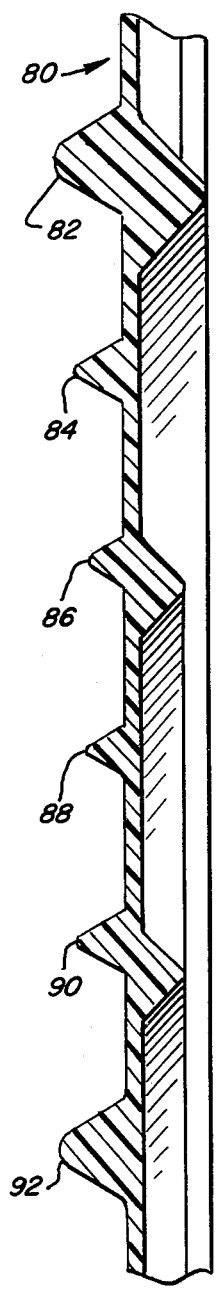
FIG. 10 is a sectional view similar to FIG. 8 but showing an alternative support member configuration.
Figure 16:
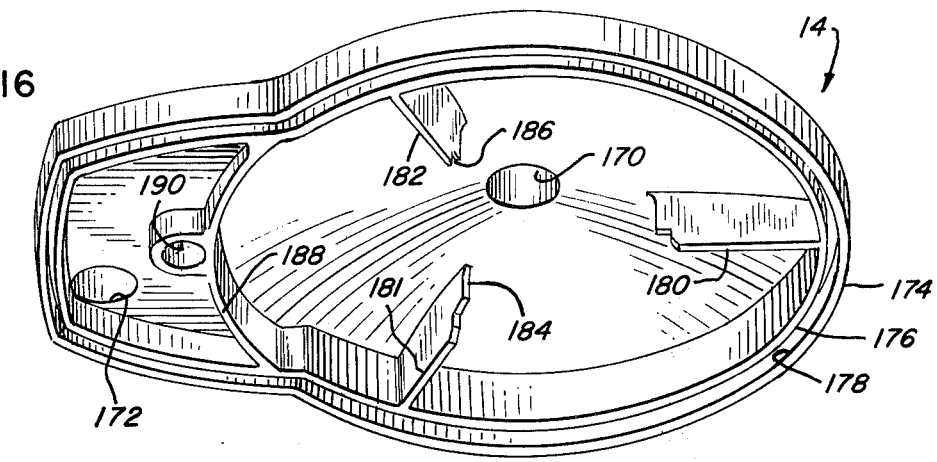
FIG. 16 is a perspective view of a top cap for use in the dialyzer.

The member 20 shown in FIGS. 9 and 10 is embossed and is wound about the core along with the membrane 22 so as to space the convolutions or windings of the membrane from each other to assure that dialysis solution flows between the convolutions, and that the solution contacts the membrane walls or surfaces. The support member 20 as shown herein is a fluid impermeable sheet of an appropriate material which has been embossed, on both sides, with an appropriate pattern of supporting and channel forming ribs. The support member 20 includes a central web 66 having, on each side, a plurality of elongated ribs, such as 68, 70, 72, 74, 76 and 78, that extend angularly across the web from one longitudinal edge to the other, The ribs on each side form an acute angle of about 60 degrees to the longitudinal edge of the web. However, the ribs on opposite sides extend in opposite directions. This causes the ribs to overlap in a diamond-like pattern, where the obtuse or included angle formed is preferably about 120°. However, that angle may be between about 60° and 140°. The rib patterns on each side of the member are identical, except for direction, and repeat in a pattern of one large rib and four smaller rounded-tip ribs.

Figure 8:
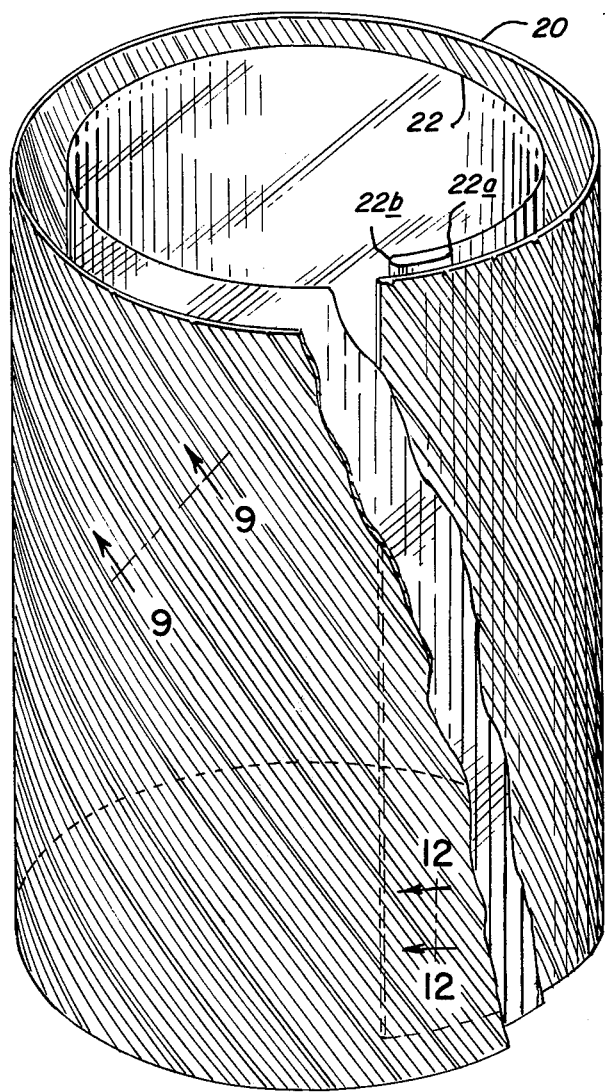
FIG. 8 is a fragmentary perspective view of a support member and a membrane for use in the dialyzer.

The preferred support member 20, as shown in FIG. 8, is fabricated of a soft, low-modulus-of-elasticy material, such as medium density polyethylene. In the preferred rib pattern, the larger or high ribs 68 and 78 are flat-topped, have a trapezoidal cross-section, are spaced about 0.323 inches apart and are about 0.021 inches tall. The smaller or low ribs 70, 72, 74 and 76 are triangularly-shaped, have rounded membrane-engaging tips, are each about 0.012 inches tall, and are substantially equally spaced between the high ribs. The total thickness of the support member is about 0.047 inches. The rib height and spacing have been selected to form an appropriate blood path in the membrane which assures a low blood pressure and substantially equal dialysis solution flow rates in the channels defined by the ribs and membrane.

Referring now to FIG. 10, there is shown an alternate support member 80, which has a different rib pattern or configuration. In this support all of the ribs 82, 84, 86, 88, 90 and 92 are triangularly shaped and have slightly rounded membrane-engaging tips. The two large or high ribs 82 and 92 are each about 0.023 inches tall and are spaced apart, on centers, about 0.323 inches. The ribs 84 and 90 which are adjacent the high ribs are each about 0.012 inches high and the innermost ribs 86 and 88 are about 0.016 inches tall. The lower ribs are substantially equally spaced between the high ribs 82 and 92. The total thickness of the member 80 is about 0.050 inches. This particular member is fabricated from a stiffer, higher modulus material, such as high density polyethylene.

As can be seen, the rib configuration can be varied so as to provide multi-rib levels which permit a wide range of control over blood path geometry.

From FIG. 12 it will be seen that when wound, the support member engages the membrane on opposite sides and due to the angular attitude of the supporting ribs, the large ribs, such as 68 and 78, overlap so as to form essentially a plurality of point contacts which grasp and hold the membrane therebetween. Since the ribs are angularly disposed, the overlapping ribs cannot interfit between one another (otherwise known as interdigitation) which could prevent or inhibit flow of blood and/or dialysis solution.

The angle ribs in either of the support members provide a clear flow channel for the dialysis solution to flow angularly from one longitudinal edge of the support member to the other. The shorter supporting ribs engage the membrane in a manner so as to define substantially equal flow channels and to prevent the membrane from contacting the web.

The inner end of the support member 20 is secured to the core assembly by fitting its inner transverse edge into the support member receiving slot 38.

Membrane End Seal

The membrane 22 is a flattened tubular member which must be sealed at each end in order to provide a leak-free conduit between the blood inlet tube 26 and blood outlet tube 28. Referring to FIGS. 3, 8 and 17, a particularly effective end seal is achieved by forming end flaps, such as 22a, and folding the flaps against the body of the membrane. Such a fold forms a transverse fold line 22b which extends from one longitudinal edge of the membrane to the other longitudinal edge thereof. Preferably the fold line is substantially perpendicular to the longitudinal edges of the membrane.

At the core assembly end, the membrane 22 is folded so as to form the flap 22a which is folded outwardly onto the membrane body so as to form the inner fold line 22b. The fold is then positioned in the wedge-receiving groove 36 for maintaining the fold line. An elongated wedge 94 is pressed into the groove 36 so as to securely retain the fold and to secure the membrane end in position on the core as it is wound. The wedge 94 matingly fits within the groove and includes a shaped outer surface 94a, which conforms to the outer configuration of the core.

Blood Button Connector

A molded plastic inlet blood button connector 100 (as shown in FIGS. 4–7), connects the inlet jack passageway 60 with the membrane interior for directing blood entering the dialyzer into the membrane. The inlet blood button connector 100 is a hollow, rivet-shaped member having a convex crown or cap portion 102 and a tapered body or barrel portion 104 having a bore or passage 105 which extends through the barrel and cap. The barrel includes a reduced diameter section or recess 106 and a tapered retaining lip 108 adjacent the end of the barrel opposite the cap. The lip and reduced diameter section define a snap-lock groove which cooperates with the inlet jack aperture shoulder 65 for snappingly engaging and securing the blood button connector to the inlet jack.

Six radial blood distributing grooves, such as 110 and 112, are provided in the cap for cooperation with the membrane in distributing blood radially outwardly from the passageway 105.

An O-ring seal 114 is seated in the recess or groove 62 surrounding the passageway 60. The O-ring 114 is an elastomeric sealing member which cooperates in providing a leak-free connection between the passageway and membrane and which is compressed when assembled so as to resiliently engage: the membrane adjacent the underside of the blood button cap 102 and hold it against the cap; the jack; and the blood button barrel 104. The O-ring 114 is of a non-aging, resilient, creep-resistant, elastomeric material, such as silicone, which minimizes seal leakage.

In order to install the inlet blood button connector 100, a small, round aperture 116, is cut into a side wall of the membrane 22 adjacent the inner end thereof and approximately centered between the membrane edges. The blood button is then slipped into the membrane from an open end, before the end is sealed, and the barrel 104 is inserted through the aperture 116 so that the cap 102 is positioned against the inside wall of the membrane 22 and the barrel extends outwardly therefrom. The blood button is then urged inwardly and snap-locks with the shoulder 65 in the jack bore. The blood button cap firmly holds the portion of the membrane contacting the underside of the cap against the inlet jack and against the O-ring so as to minimize seal leakage.

With the end seal secured by the inlet jack wedge 94, a substantially leak-free seal and conduit system is provided for blood flowing through the inlet tube 26, the inlet elbow 48, the inlet jack passageway 60 and the blood button connector 100.

An advantage to the connector 100 is that the membrane 22 is held against the core assembly 18 and any force applied to the inlet tube is transmitted to the core assembly 18 rather than directly to the membrane 22.

With the membrane end sealed, the blood button 100 secured to the inlet jack 50, and the support member 20 positioned in the support member recess 38, the member 20 and membrane 22 are wound together about the core until the predetermined length of the support member and membrane are exhausted. Normally, the support member 20 is both longer and wider than membrane 22. The support member 20 and membrane 22 are then secured to the outlet jack assembly 24. Furthermore with both the membrane and support secured to the core assembly, relative movement between the membrane and member is reduced which further minimizes possible damage to the membrane.

Outlet Jack Assembly

The outlet jack assembly 24, as shown in FIGS. 2 and 3, includes an elongated molded outlet jack member 120, as shown in FIGS. 13-15. The jack has a concave inner face 122, which is constructed to fit against the outermost winding of the membrane 22. The inner face includes several longitudinally extending sections for cooperation with the membrane which it contacts. The first section 124 is a blood inlet path defining section which includes a plurality of spaced parallel ribs, such as 126 and 128, which extend inwardly from the leading edge of the jack. These ribs 126 and 128 serve to direct blood flow in the membrane further along the inner face of the outlet jack.

A recessed blood flow collection path or channel 130 is positioned adjacent the blood path section 124 and extends for the full length of the jack. A blood button receiving bore and blood flow passageway 132 is centrally positioned in the blood flow channel. A countersunk O-ring receiving recess 136 surrounds the bore and faces toward the inside of the dialyzer. The bore 132 extends through an outwardly extending boss 134 on the back side of the outlet jack. An elbow 138, which is bonded to the inlet end of the outlet tube 28, telescopically engages and is bonded to the boss 134, and directs blood flowing from the passageway 132 to the blood outlet tube 28.

An inwardly facing fold-retaining and wedge-receiving groove 140 is positioned on the side of the blood flow channel 130 opposite the blood directing ribs 126 and 128.

The bottom end of the jack is defined by a bottom fin or plate 142, which extends rearwardly or outwardly from the inner face 122. A top plate or fin 144 extends across the top of the jack, but it will be noted that the top plate is recessed at a position above the boss 134 for cooperation in positioning the blood outlet tube 28. A pair of elongated rigidifying ribs 146 and 148 on the outer side of the jack connect the top and bottom fins. Top and bottom locating pins 150 and 152 project from the fins 144 and 142, respectively.

The membrane 22 is connected to the outlet jack 24 with an outlet blood button connector 154, which is substantially identical with the previously described inner blood button connector 100.

An O-ring 156, similar to the O-ring used with the inlet jack assembly, is positioned in the O-ring groove 136 and the outlet blood button connector is snap-locked to the outlet jack to hold the membrane to the outlet jack in the same manner as the inlet jack. The membrane is end-sealed by a fold seal of the type described in connection with the inlet jack with the main difference being that the outer flap is positioned on the inner side of the membrane. The outlet jack wedge 157 retains and holds the end seal in position. In the assembly, the outer end of the support member thereof is positioned back behind the inner face of the outlet jack.

Housing and Assembly

As seen in FIGS. 2-3 and 16-18, once the core assembly 18, support member 20 and membrane 22 and outlet jack 24 are assembled, the housing 12 is slipped over the assembly so as to retain it in position with the outlet jack positioned within the protruding portion 12a which extends along the side of the housing 12. The top and bottom caps 14 and 16 are mounted to and sealingly engage the ends of the housing.

The top cap 14 is molded so as to provide a centrally positioned blood inlet tube aperture 170 and an offset blood outlet tube aperture 172. The blood inlet tube 26 extends through and sealingly engages the inlet aperture 170, and the blood outlet tube 28 passes through and sealingly engages the outlet aperture 172. The cap 14 also includes the spaced parallel outer and inner walls 174 and 176, which define a groove 178 therebetween for sealingly engaging the top edge of the housing 12.

Three cap ribs 180, 182 and 184 extend inwardly from the cylindrical portion of inner wall 176 toward the blood inlet tube aperture 170. Each of the ribs includes a tapered and notched inner edge or shoulder 186, which is adapted to engage the top edge of the core assembly for centrally positioning the core assembly in the housing. The lower surface, such as 181, of each rib engages the top edge of the wound membrane and support so as to prevent telescoping or upward movement of the membrane and support.

A small curved, outlet-jack engaging wall 188 is molded across the protruding portion of the cap for general alignment with the inner face 122 of the outlet jack. A pin-receiving socket 190 is also molded adjacent the wall and is for receiving the top pin 150 on the top end of the outlet jack.

The bottom cap 16 includes parallel outer and inner peripheral walls 192 and 194, which together define a peripheral groove 196 for cooperative sealing engagement with the bottom edge of the housing 12. A small, curved outlet jack engaging wall 198 is molded across the protruding portion of the cap and is generally shaped to conform to the inner face of the outlet jack. An outlet jack pin-receiving socket 200 is molded along the wall for receiving the outlet jack bottom pin 152.

A tubular inlet 202 is molded to the outer and underside of the bottom cap and includes a bore 204 which communicates with the inlet 30. The outlet 32 is formed by a large aperture in the cap. The aperture is surrounded by a core assembly locating and receiving shoulder 206 and collar 208. It should be noted that the inlet bore 204 is positioned between the collar 208 and wall 198.

With the housing 12 in place, the inlet tube 26 and outlet tube 28 are then passed through the upper cap and the upper cap is fitted downwardly against the top edge of the housing, the top of the core assembly and the top of the outlet jack. In a similar manner, the bottom cap is fitted against the bottom edge of the housing and against the core assembly and the outlet jack. It will be noted that with such an assembly both the blood inlet tube 26 and blood outlet tube 28 extend in a generally parallel and axial arrangement whereby kinking and bending of the tubes are minimized.

Once the core assembly 18 and outlet jack assembly 24 are fixed in position in the housing by the top cap 14 and bottom cap 16, any forces applied to the tubes 26 or 28 are transmitted through the core or jack assemblies to the caps and housing. Thus, those forces are not applied directly to the membrane and membrane rupture is reduced.

Operation

As seen in FIG. 2, incoming dialysis solution flows, as indicated by arrow 210, upwardly through the inlet 30.

The dialysis solution then flows around the core assembly locating collar and upwardly through the wound membrane and support member into the center of the core assembly 18 as indicated by arrows 216 and 218. From there the dialysis solution flows downwardly and exits the dialyzer through the outlet 32. Thus the dialysis solution flow path forms a generally inverted U-shape.

Blood entering the dialyzer through the tube 26 flows downwardly through tube 26, as indicated by arrow 220, through the elbow into the inlet jack and through the blood button bore into the membrane 22. Blood then flows inside the membrane in a spiral path around the core until it reaches the outlet jack assembly 24. At the outlet jack assembly, the blood is directed by the blood directing ribs, such as 126 and 128, into the blood flow channel 130 and hence to the blood button connector 154. Blood entering the blood button connector 154 flows through the outlet jack passageway 132 into the outlet elbow 138 and from there through the tube 28.

The blood is prevented from flowing out of the end seals by virtue of the folded-and-locked end seal arrangements, both at the inlet jack and outlet jack. The possibilities of blood leak have been minimized by the selection of the support materials and rib structure. Dialysis solution flow into the outlet jack area is minimized by the engagement of the arcuate walls 188 and 198 with the outlet jack. However, some dialysis solution flow into the outlet jack area can be tolerated.

It will be appreciated that numerous changes and modifications can be made to the embodiment disclosed herein without departing from the spirit and scope of this invention.

What is claimed is:

1. A coil dialyzer for use in an artificial kidney system, which includes an elongated, open-ended tubularly shaped, semipermeable membrane for carrying a fluid to be treated in the dialyzer, and an end sealing system for preventing fluid flow from at least one end of said membrane other than through inlet and outlet conduits, said system comprising: at least one end of said membrane having a flap portion folded so as to define a fold line extending between the longitudinal edges of said membrane; means defining a membrane receiving groove; and wedge means for engaging said folded membrane and for cooperating with said groove means to maintain said fold line and retain said folded membrane in said groove.

2. A coil dialyzer for use in an artificial kidney system, which includes an elongated, open-ended tubularly shaped, semipermeable membrane for carrying a fluid to be treated in the dialyzer, and an end sealing system for preventing fluid flow from at least one end of said membrane other than through the inlet and outlet conduits, said system comprising: at least one end of said membrane having a flap portion folded to define a fold line extending between the longitudinal edges of said membrane; membrane receiving member; and means for engaging said folded membrane and for cooperating with said receiving member to maintain said fold line.

3. The coil dialyzer according to claim 2 wherein said receiving member includes a groove defined in a substantially rigid member and said means for engaging said folded membrane includes a wedge member which engages said groove with sufficient force to maintain said fold line for sealing the semipermeable membrane along said fold line.

4. The coil dialyzer according to claim 3 wherein the semipermeable membrane has both ends sealed along the fold line and further defines a blood inlet near one sealed end and a blood outlet near the other sealed end for allowing the passage of blood through the inlet and the path defined by the semipermeable membrane to the outlet.

5. The coil dialyzer according to claim 4 wherein said groove extends slightly greater than the width of said tubular membrane and said wedge member extends a corresponding length to insure that the entire width of the membrane will be folded to prevent blood flow therethrough.

* * * * *